United States Patent
Moss et al.

(10) Patent No.: US 12,504,533 B2
(45) Date of Patent: Dec. 23, 2025

(54) RADAR SYSTEM WITH SUB-BANDS

(71) Applicant: MAGNA ELECTRONICS SWEDEN AB, Vargarda (SE)

(72) Inventors: Jonathan Moss, Unterschleissheim (DE); Hansjerg Goelz, Unterschleissheim (DE); Michael Kritzner, Niederwerrn (DE); Andreas Lefevre, Niederwerrn (DE); Martin Fuchs, Unterschleissheim (DE)

(73) Assignee: MAGNA ELECTRONICS SWEDEN AB, Vargarda (SE)

( * ) Notice: Subject to any disclaimer, the term of this patent is extended or adjusted under 35 U.S.C. 154(b) by 542 days.

(21) Appl. No.: 17/799,300

(22) PCT Filed: Feb. 16, 2021

(86) PCT No.: PCT/EP2021/053773
§ 371 (c)(1),
(2) Date: Aug. 12, 2022

(87) PCT Pub. No.: WO2021/165262
PCT Pub. Date: Aug. 26, 2021

(65) Prior Publication Data
US 2023/0084041 A1    Mar. 16, 2023

(30) Foreign Application Priority Data
Feb. 20, 2020    (EP) .................... 20158519

(51) Int. Cl.
*G01S 13/931*    (2020.01)
*G01S 7/02*    (2006.01)
(52) U.S. Cl.
CPC .......... *G01S 13/931* (2013.01); *G01S 7/0231* (2021.05)

(58) Field of Classification Search
CPC ........................ G01S 13/931; G01S 7/0231
See application file for complete search history.

(56) References Cited

U.S. PATENT DOCUMENTS

| 7,605,745 B2 | 10/2009 | Honda et al. |
| 10,139,473 B2 | 11/2018 | Soga |

(Continued)

FOREIGN PATENT DOCUMENTS

| DE | 102018201303 A1 | 8/2019 |
| EP | 3244229 A1 | 11/2017 |

(Continued)

OTHER PUBLICATIONS

International Search Report and Written Opinion of PCT/EP2021/053773, mailed May 3, 2021.

(Continued)

*Primary Examiner* — William Kelleher
*Assistant Examiner* — Hailey R Le
(74) *Attorney, Agent, or Firm* — DICKINSON WRIGHT PLLC (57) ABSTRACT

A radar system (210) for a vehicle (200), comprising a plurality of radar transceivers (202, 203, 204, 205) and a control unit (208). Each radar transceiver (202, 203, 204, 205) is associated with a main pointing direction (P1, P2, P3, P4) and a certain frequency sub-band (A, B, C, D), where the sub-bands (A, B, C, D) together form a certain dedicated frequency band. The control unit (208) is adapted to define heading intervals which divide a full turn interval 0°-360° into sections, assign a corresponding sub-band (A, B, C, D) to each heading interval, determine a present vehicle heading (F), and to assign a corresponding sub-band (A, B, C, D) to each one of the radar transceivers (202, 203, 204, 205) in dependence of the heading interval that includes the present vehicle heading (F).

12 Claims, 6 Drawing Sheets

(56) References Cited

U.S. PATENT DOCUMENTS

| | | | |
|---|---|---|---|
| 10,451,729 B2 | 10/2019 | Khlifi | |
| 2005/0192016 A1* | 9/2005 | Zimmermann | H04W 16/14 |
| | | | 455/450 |
| 2007/0200747 A1 | 8/2007 | Okai et al. | |
| 2008/0106458 A1 | 5/2008 | Honda et al. | |
| 2012/0200224 A1* | 8/2012 | Schofield | B60Q 1/1423 |
| | | | 315/81 |
| 2016/0223643 A1* | 8/2016 | Li | G01S 7/0236 |
| 2016/0223644 A1 | 8/2016 | Soga | |
| 2016/0372832 A1* | 12/2016 | Park | G01S 7/0231 |
| 2017/0285165 A1 | 10/2017 | Khlifi | |
| 2020/0408891 A1* | 12/2020 | Brett | G01S 13/931 |
| 2021/0055413 A1* | 2/2021 | Engewald | H04B 1/0483 |
| 2021/0055734 A1* | 2/2021 | Yokev | G08G 1/163 |
| 2022/0390583 A1* | 12/2022 | Himmelstoss | G01S 7/0234 |

FOREIGN PATENT DOCUMENTS

| | | | |
|---|---|---|---|
| GB | 2299722 A | | 10/1996 |
| JP | 5182645 B2 | * | 4/2013 |
| JP | 2013160585 A | | 8/2013 |

OTHER PUBLICATIONS

First Office Action regarding corresponding CN App. No. 2021800087874; dated Mar. 25, 2025.

* cited by examiner

RADAR SYSTEM WITH SUB-BANDS

CROSS-REFERENCE TO RELATED APPLICATIONS

This application is a 35 U.S.C. § 371 national phase of PCT International Application No. PCT/EP2021/053773, filed Feb. 16, 2021, which claims the benefit of priority under 35 U.S.C. § 119 to European Patent Application No. 20158519.7, filed Feb. 20, 2020, the contents of which are incorporated herein by reference in their entirety.

FIELD OF THE INVENTION

The present disclosure relates to radar systems adapted for automotive applications. There are disclosed radar systems and methods for operating radar systems.

BACKGROUND

A radar transceiver is, normally, a device arranged for transmission and reception of radar signals in a dedicated radar frequency band. Radar transceivers are commonly used in vehicles for monitoring vehicle surroundings. Automatic Cruise Control (ACC) functions, Emergency Braking (EB) functions, Advanced Driver Assistance Systems (ADAS) and Autonomous Drive (AD) are some examples of applications where radar data represents an important source of information on which vehicle control is based.

Many of the dedicated automotive radar frequency bands allow uncoordinated transmission, which means that two or more radar transceivers may transmit at the same time in the same frequency band, and thus interfere with each other.

EP 3244229 discussed the general effects of interference on a frequency modulated continuous wave (FMCW) radar system, and proposed methods to repair an interfered radar signal.

Despite the often impressive efficiency of previously proposed repair methods, there is a need for further improvements in vehicular radar systems in order to reduce interference, and possibly to provide a lower cost means of avoiding interference for radars.

SUMMARY OF EMBODIMENTS OF THE PRESENT INVENTION

It is an object of the present disclosure to provide improved radar systems where interference is reduced or removed entirely, compared to known vehicular radar systems, such as uncoordinated automotive radar based on uncoordinated FMCW transmission.

This object is obtained by a radar system for a vehicle, the radar system comprising a plurality of radar transceivers and a control unit. Each radar transceiver is associated with a main pointing direction and a certain frequency sub-band, where the sub-bands together form a certain dedicated frequency band. The control unit is adapted to define heading intervals which divide a full turn interval 0°-360° into sections, to assign a corresponding sub-band to each heading interval, and to determine a present vehicle heading. The control unit is further adapted to assign a corresponding sub-band to each one of the radar transceivers in dependence of the heading interval that comprises the present vehicle heading.

In this way, the certain dedicated frequency band is divided into sub-bands which are assigned to the radar transceivers in question, which enables interference reduction. According to some aspects of embodiments of the present invention, the sub-bands are non-overlapping.

According to some aspects of embodiments of the present invention, the control unit is adapted to apply a hysteresis before performing a shift of sub-bands when passing a border.

In this way, unwanted sub-band toggling is avoided.

According to some aspects of embodiments of the present invention, the radar system comprises a front radar transceiver that is assigned another dedicated frequency band.

In this way, a long-range radar can be used independently.

According to some aspects of embodiments of the present invention, the control unit is adapted to perform signal repair and/or to have a slanted polarization direction of the front radar transceiver when experiencing front radar interference.

In this way, interference can be remedied such that the front radar transceiver can work in an efficient and reliable manner.

According to some aspects of embodiments of the present invention, the radar system comprises a first front corner radar transceiver, a second front corner radar transceiver, a first rear corner radar transceiver and a second rear corner radar transceiver. The corner radar transceivers are assigned a corresponding sub-band in dependence of the heading interval that comprises the present vehicle heading.

In this way the certain dedicated frequency band can be divided into four frequency bands. Vehicles that are equipped in this manner will not cause mutual interference irrespective of their respective positions.

According to some aspects of embodiments of the present invention, the radar system comprises at least one lateral radar transceiver, where the control unit is adapted to assign a sub-band to each lateral radar transceiver that corresponds to a sub-band presently being assigned to a neighboring radar transceiver in dependence of the heading interval that comprises the present vehicle heading.

In this way, a dedicated lateral radar coverage can be obtained.

According to some aspects of embodiments of the present invention, the control unit is adapted to time multiplex the use of the current sub-band between a lateral radar transceiver and a corner radar transceiver.

In this way, interference between a lateral radar transceiver and a neighboring corner radar transceiver is avoided.

According to some aspects of embodiments of the present invention, the control unit is adapted to determine if a radar transceiver that has been assigned a corresponding sub-band in dependence of the heading interval that comprises the present vehicle heading is subject to interference, or will cause interference. If that is not the case, the control unit is adapted to assign two or more sub-bands to that radar transceiver.

In this way, a larger part of the certain dedicated frequency band can be used for each corner radar transceiver.

According to some aspects of embodiments of the present invention, the control unit is adapted to determine a present vehicle heading by means of GNSS (Global Navigation Satellite System) data.

According to some aspects of embodiments of the present invention, the control unit is adapted to determine a present vehicle heading by determining a predominant road extension direction.

In this way, unwanted sub-band toggling is avoided.

There are also disclosed herein vehicles and methods associated with the above-mentioned advantages.

Generally, all terms used in this description are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

Environments of the present disclosure will now be described in more detail with reference to the appended drawings, where
FIG. 1 schematically illustrates a traffic scenario.

DETAILED DESCRIPTION

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the disclosure. As used herein, the singular forms "a", "an" and "the" are intended to include the plural forms as well, unless the context clearly indicates otherwise.

Figure 1:
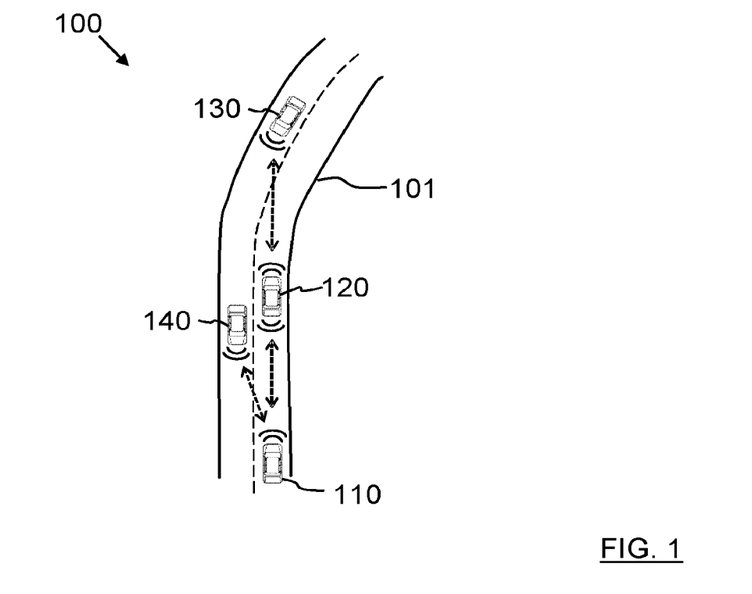

FIG. 1 shows a traffic scenario 100 where vehicles 110, 120, 130, 140 travel on a road 101. Each vehicle comprises one or more radar transceivers that transmit in a common frequency band in an uncoordinated manner, which means that radars may unknowingly interfere with each other.

In FIG. 1, the front radar transceivers of vehicle 120 and vehicle 130 may generate interfere to each other, as well as the front radar transceivers of vehicle 110 and vehicle 140. Vehicle 120 also comprises rearward looking corner radar transceivers which may interfere with, e.g., the front radar transceiver of vehicle 110.

Figure 2:
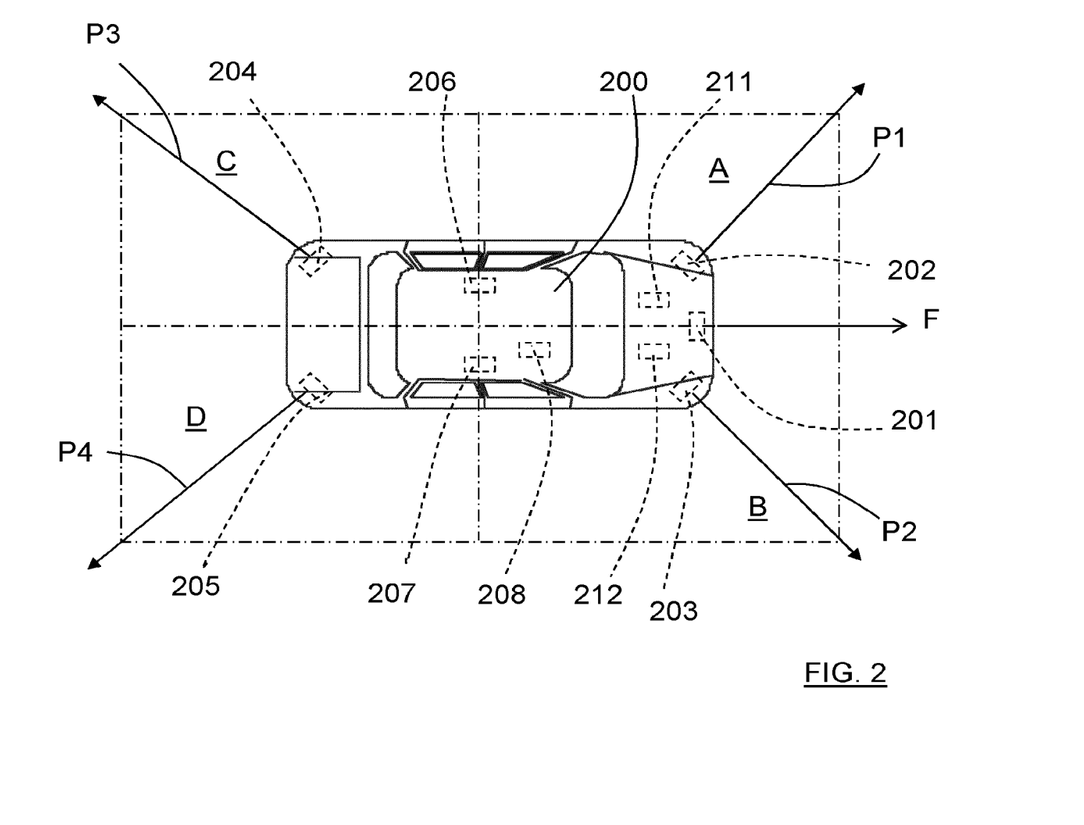
FIG. 2 schematically shows a top view of a vehicle.
Figure 6:
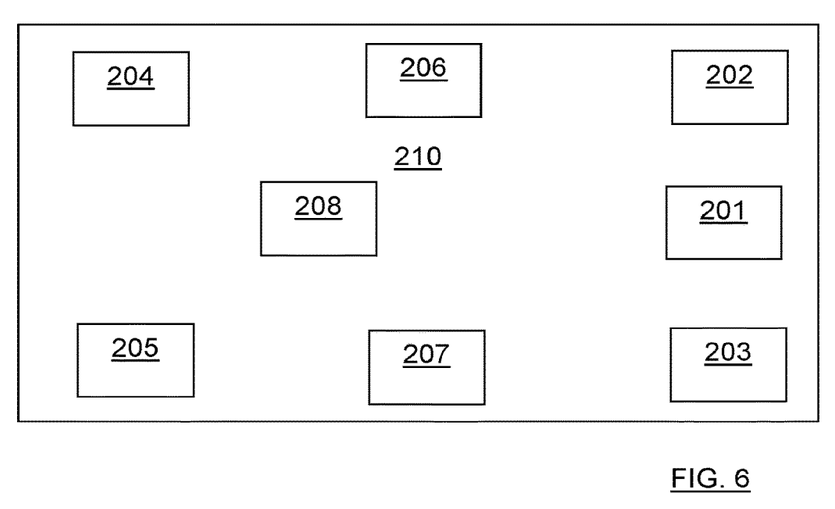
FIG. 6 shows an example vehicle radar system.

As shown in FIG. 2, and also with reference to FIG. 6, there is an ego vehicle 200, having a present vehicle heading F, that comprises a radar system 210 that in turn comprises, a first front corner radar transceiver 202, a second front corner radar transceiver 203, a first rear corner radar transceiver 204, a second rear corner radar transceiver 205 and a control unit 208. Each corner radar transceiver 202, 203, 204, 205 is associated with a corresponding coverage main or boresight direction P1, P2, P3, P4 around which mutually different radar coverages are obtained in a known manner. The corner radar transceivers 202, 203, 204, 205 are adapted to operate in a first dedicated radar frequency band, such as for example the 77-81 GHz frequency band.

The first dedicated radar frequency band is divided equally between the four corner radar transceivers, such that four, suitably non-overlapping, sub-bands A, B, C, D each of 1 GHz bandwidth are acquired, as schematically indicated with dash-dotted lines in FIG. 2.

Figure 3:
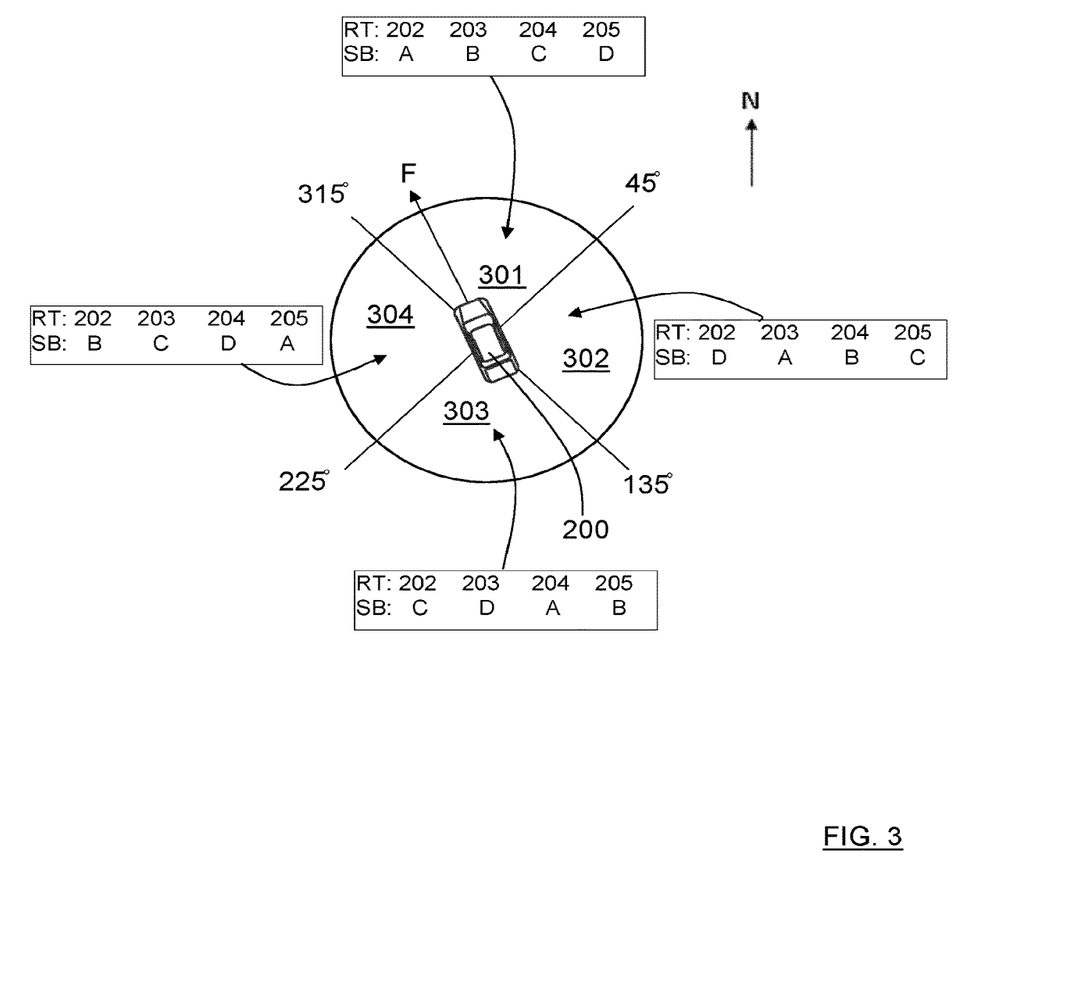
FIG. 3 schematically shows a top view of a vehicle with heading intervals.

With reference also to FIG. 3 that shows an example, according to the present disclosure, the control unit 208 is adapted to define heading intervals 301, 302, 303, 304 which divide a full turn interval 0°-360° into sections, and to assign a corresponding sub-band A, B, C, D to each heading interval 301, 302, 303, 304. The control unit 208 is further adapted to determine the present vehicle heading F, and to assign a corresponding sub-band A, B, C, D to each one of the radar transceivers 202, 203, 204, 205 in dependence of the heading interval that comprises the present vehicle heading F.

Each sub-band A, B, C, D is associated with a certain corresponding geographical orientation of the ego vehicle 200, and thus the radar system 210, with respect to a fixed direction such as the magnetic north N, or in relation to a map. The geographical orientation is determined from the present vehicle heading F. Each corner radar transceiver 202, 203, 204, 205 is assigned a certain sub-band A, B, C, D in dependence of the present vehicle heading F. When the ego vehicle 201, and thus the radar system 210, has turned 360°, all corner radar transceivers 202, 203, 204, 205 have been assigned to all sub-bands A, B, C, D.

According to some aspects of embodiments of the present invention, with continued reference to FIG. 3, the fixed direction is the magnetic north N where 0° corresponds to the fixed direction N. The heading intervals 301, 302, 303, 304 are arranged such that a first heading interval 301 is defined with a first angular interval 45°-135°, a second heading interval 302 is defined with a second angular interval 45°-135°, a third heading interval 303 is defined with a third angular interval 135°-225°, and a fourth heading interval 304 is defined with a fourth angular interval 225°-315°. In FIG. 3 "RT" stands for "radar transceiver" and SB for "sub-band".

According to some aspects of embodiments of the present invention, the angular intervals can be of mutually different sizes, and also partially overlapping. The angular interval should cover at least a majority of a full turn of 360°, and most suitably a complete full turn of 360°.

The present disclosure according to the example in FIG. 3 is furthermore illustrated in FIG. 4A-4F where the ego vehicle turns clockwise. From FIG. 4A to FIG. 4B, the four sub-bands A, B, C, D are assigned to the same corner radar transceivers, a first sub-band A and a second sub-band B being assigned to the first front corner radar transceiver 202 and the second front corner radar transceiver 203, correspondingly, and a third sub-band C and a fourth sub-band D being assigned to the first rear corner radar transceiver 204 and the second rear corner radar transceiver 205, correspondingly.

Figure 4A:
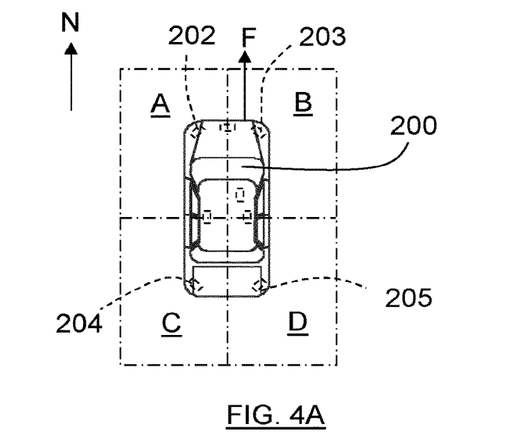
FIG. 4A-4F illustrate different vehicle orientations.
Figure 4B:
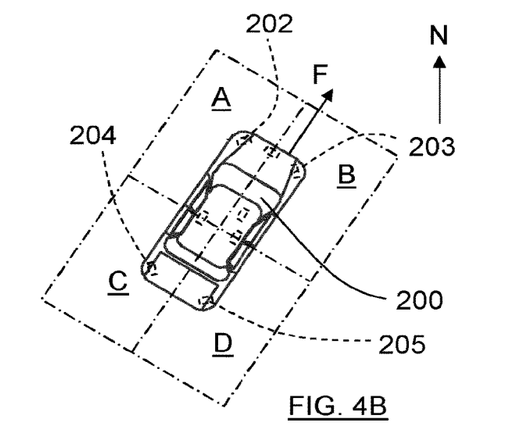
Figure 4C:
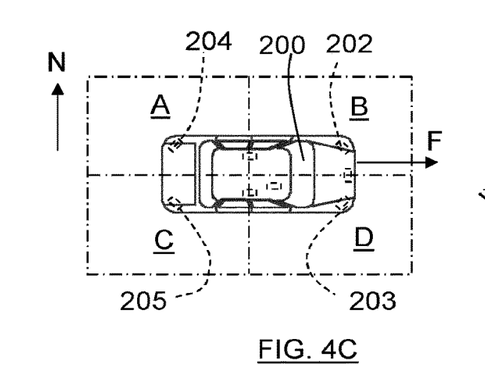
Figure 4D:
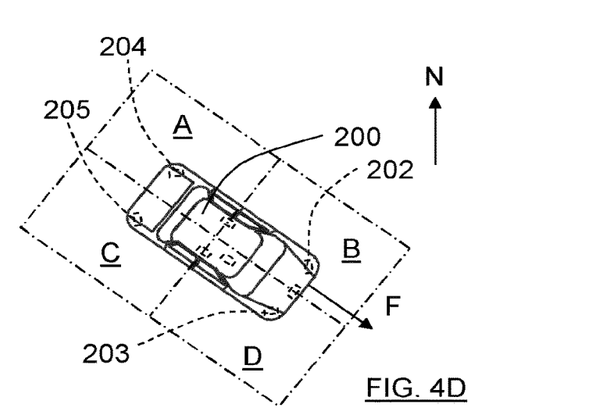

In FIG. 4C, the four sub-bands A, B, C, D have shifted such that the second sub-band B and the fourth sub-band D are assigned to the first front corner radar transceiver 202 and the second front corner radar transceiver 203, correspondingly, and the first sub-band A and the third sub-band C are assigned to the first rear corner radar transceiver 204 and the second rear corner radar transceiver 205, correspondingly. In FIG. 4D, the turning continues, but not yet to such an extent that the sub-band switch from their associated corner radar transceiver. A border or limit for shifting the sub-bands is, however, almost reached.

Figure 4E:
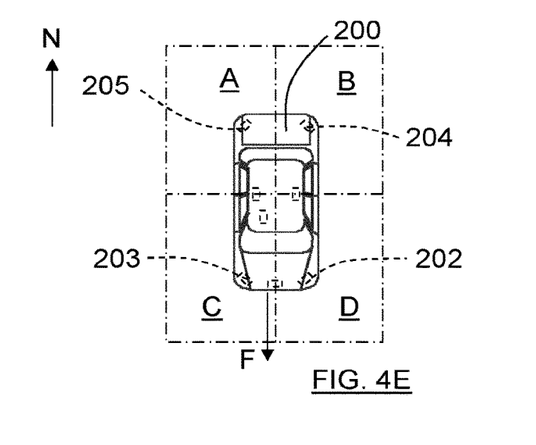
Figure 4F:
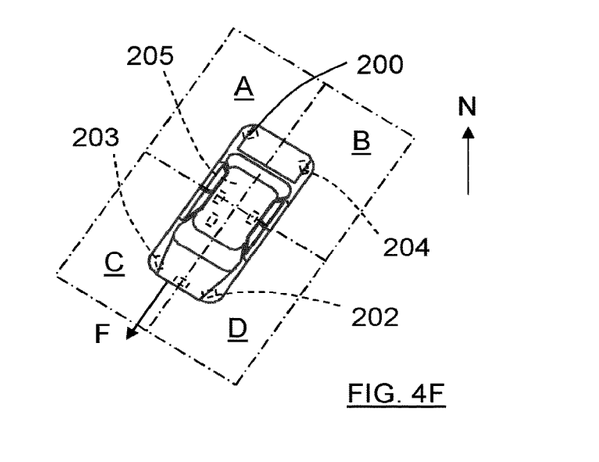

In FIG. 4E, the four sub-bands A, B, C, D have shifted such that the fourth sub-band D and the third sub-band C are assigned to the first front corner radar transceiver 202 and the second front corner radar transceiver 203, correspondingly, and the second sub-band B and the first sub-band A are assigned to the first rear corner radar transceiver 204 and the second rear corner radar transceiver 205, correspondingly. In FIG. 4F, the turning continues, but not to such an extent that the sub-band switch from their associated corner radar transceiver. A border or limit for shifting the sub-bands is, however, almost reached.

Figure 5:
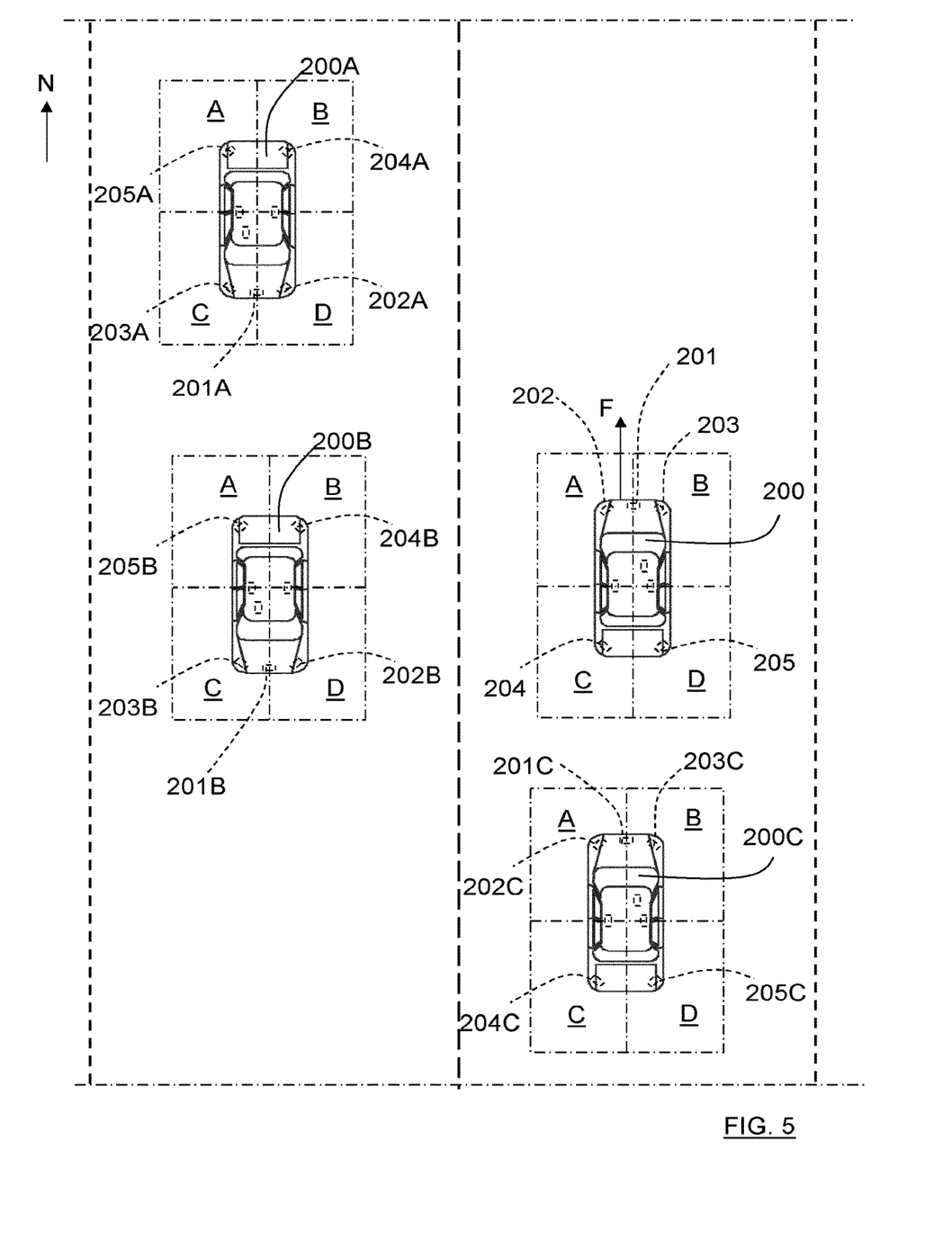
FIG. 5 schematically illustrates a traffic scenario.

A traffic situation 400 is shown in FIG. 5, where the ego vehicle 200 is meeting an oncoming vehicle 200A and a passing vehicle 200B. The ego vehicle 200 is also followed by a rear vehicle 200C. All vehicles 200, 200A, 200B, 200C are equipped according to the present disclosure, each one having the frequency sub-bands A, B, C, D assigned to their corresponding corner radar transceivers 202, 203, 204, 205; 202A, 203A, 204A, 205A; 202B, 203B, 204B, 205B; 202C, 203C, 204C, 205C in dependence of the present vehicle orientation.

It follows from FIG. 5 that none of the sub-bands A, B, C, D of any one of the vehicles 200, 200A, 200B, 200C is overlapping with a sub-band A, B, C, D of any one of the other vehicles 200, 200A, 200B, 200C, 200D, and thus there is no interference between the corner radars transceivers 202, 203, 204, 205; 202A, 203A, 204A, 205A; 202B, 203B, 204B, 205B; 202C, 203C, 204C, 205C of any one of the vehicles 200, 200A, 200B, 200C irrespective of the vehicle position.

According to some aspects of embodiments of the present invention, the radar system 210 comprises a front radar transceiver 201 that is adapted to operate in a second dedicated radar frequency band, such as for example the 76-77 GHz frequency band available for vehicular long-range radar applications. This band has the benefit of higher allowed equivalent isotropic radiated power (EIRP) in European countries, which enables front long-range radar applications such as adaptive cruise control According to some aspects of embodiments of the present invention, optionally, the ego vehicle 200 comprises a first lateral radar transceiver 206 and a second lateral radar transceiver 207. The first lateral radar transceiver and the second lateral radar transceiver are arranged on opposite sides of the vehicle, where they are configured to cover fields of view extending laterally from a vehicle forward direction F.

In case of the ego vehicle comprising a front radar transceiver 201, and each one of the other vehicles 200A, 200B, 200C comprises a corresponding front radar transceiver 201A, 2021B, 201C. Each front radar transceiver 201, 201A, 2021B, 201C is adapted to operate in the second dedicated radar frequency band, which means that there can be interference. In the situation in FIG. 5 there will be interference between the corresponding front radar transceivers of the ego vehicle 200 and the oncoming vehicle 200A, and between the corresponding front radar transceivers of the passing vehicle 200B and the rear vehicle 200C. This interference can be alleviated by conventional interference cancelling methods, such as for example by means of the repair method described in EP 3244229. The usage of, for example, at least one of slant polarizations, scheduling and CDMA (Code-division multiple access) techniques can also be used to counteract interference. Two front radars having a slant antenna polarization of +45° which face each other will have mutually orthogonal polarizations.

Interference can also be caused by other vehicles that are not equipped according to the present disclosure, and then interference can be alleviated by conventional interference cancelling methods, such as for example by means of the repair method described in EP 3244229.

According to some aspects of embodiments of the present invention, in case of lateral radar transceivers 206, 207 being present as shown in FIG. 2, a lateral transceivers 206, 207 will be assigned to the same sub-band as either the front corner radar transceiver or rear corner radar transceiver that is neighboring, i.e. positioned on the same side as the lateral radar transceiver. This means that, for example, the first lateral radar transceiver 206 is either assigned to the same sub-band as either the first front corner radar transceiver 202 or the first rear corner radar transceiver 204.

According to some aspects of embodiments of the present invention, a lateral radar transceiver 206, 207 can be assigned to the same sub-band as either neighboring corner radar transceiver in a time-multiplexed manner. This means that a lateral radar transceiver and a neighboring corner radar transceiver share the same sub-band, but at different time slots such that mutual interference dies not occur.

The sub-bands may according to some aspects of embodiments of the present invention, be subject to some overlapping, but should at least be mostly non-overlapping. One or more of the sub-bands may have mutually different bandwidths.

According to some aspects of embodiments of the present invention, the control unit 208 is adapted to keep track of the ego vehicle's orientation by means of compass data obtained by a compass device 211 and/or a GNSS (Global Navigation Satellite System) device 212 of any suitable kind and being. According to some aspects of embodiments of the present invention, the control unit 208 is adapted to keep track of the ego vehicle's orientation by means of map data acquired from a GNSS device of any suitable kind. The map data can be used for determining a road main extension that is used for determining the ego vehicle's orientation. As an example, with reference to FIG. 3, if a road is determined to extend mainly in a westward direction, the heading is determined to be comprised in the fourth heading interval 304.

By means of the acquired ego vehicle orientation, correspond to the present vehicle heading F, the control unit 208 is adapted to control which sub-band A, B, C, D that is to be assigned to which corner radar transceiver 202, 203, 204, 205 at a certain moment.

There exists potential ambiguities when the ego vehicle 200 travels in such a direction where the sub-band used may change with small direction changes in the road. This means that the sub-bands A, B, C, D are shifted back and forth between the corner radar transceivers 202, 203, 204, 205 when the present vehicle heading F lies around a border or limit for shifting the sub-bands A, B, C, D, such as for example as illustrated in FIG. 4B, FIG. 4D and FIG. 4F; see also FIG. 3 where the borders lie around the angles 45°, 135°, 225°, and 315°. According to some aspects of embodiments of the present invention, in such cases, the control unit 208 use an averaging of car heading and/or hysteresis to avoid unwanted sub-band toggling. Further, an algorithm that uses mapping information may be used to decide that the road is predominantly extending in a certain direction and hence adapt the bearing thresholds to ensure that the channels are not changed in a detrimental way.

According to some aspects of embodiments of the present invention, two or more sub-bands, or the entire first dedicated radar frequency band, may be used at each corner radar transceiver that is not determined to be subject to interference, or to cause interference. For example, this means that as long as the ego vehicle 200 travels alone on a road, there is no need to divide the first dedicated radar frequency band into sub-bands A, B, C, D, but each corner radar transceiver, and possibly each lateral radar transceiver can use the entire first dedicated radar frequency band. This type of channel overlay can also be used when measures can be taken to avoid causing interference to radar transceiver in other vehicles.

As soon as one or more radar transceivers have been determined to be subject to interference, or to cause interference, the sub-bands A, B, C, D are applied in accordance to the present disclosure as described above.

The present disclosure can be applied to any suitable radar transceivers, and the number of sub-band can be of any suitable number while the functionality of the present disclosure is maintained, i.e. sub-bands of other radar transceivers, at other vehicles or other items in the environment, are mutually different such that interference is minimized.

Figure 7:
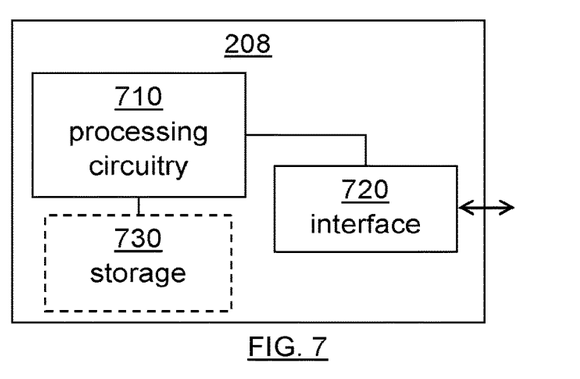
FIG. 7 schematically illustrates a control unit.

FIG. 7 schematically illustrates, in terms of a number of functional units, the components of the control unit 208 according to an embodiment. Processing circuitry 710 is provided using any combination of one or more of a suitable central processing unit (CPU), multiprocessor, microcontroller, digital signal processor (DSP), dedicated hardware accelerator, etc., capable of executing software instructions stored in a computer program product, e.g. in the form of a storage medium 730. The processing circuitry 710 may further be provided as at least one application specific integrated circuit (ASIC), or field programmable gate array (FPGA).

Particularly, the processing circuitry 710 is configured to cause the control unit 208 to perform a set of operations, or steps. These operations, or steps, were discussed above in connection to the various radar transceivers and methods. For example, the storage medium 1030 may store the set of operations, and the processing circuitry 710 may be configured to retrieve the set of operations from the storage medium 730 to cause the control unit 208 to perform the set of operations. The set of operations may be provided as a set of executable instructions. Thus, the processing circuitry 710 is thereby arranged to execute methods and operations as herein disclosed.

The storage medium 730 may also comprise persistent storage, which, for example, can be any single one or combination of magnetic memory, optical memory, solid state memory or even remotely mounted memory.

The control unit 208 may further comprise a communications interface 720 for communications with at least one other unit. As such, the radar interface 720 may comprise one or more transmitters and receivers, comprising analogue and digital components and a suitable number of ports for wired or wireless communication.

The processing circuitry 710 is adapted to control the general operation of the control unit 208 e.g. by sending data and control signals to the external unit and the storage medium 730, by receiving data and reports from the external unit, and by retrieving data and instructions from the storage medium 730. Other components, as well as the related functionality, of the control unit 208 are omitted in order not to obscure the concepts presented herein.

Figure 8:
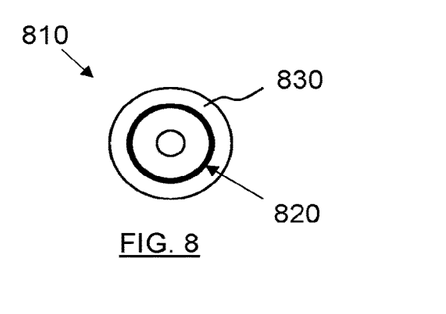
FIG. 8 shows an example computer program product.

FIG. 8 shows a computer program product 810 comprising computer executable instructions 820 arranged on a computer readable medium 830 to execute any of the methods disclosed herein.

Figure 9:
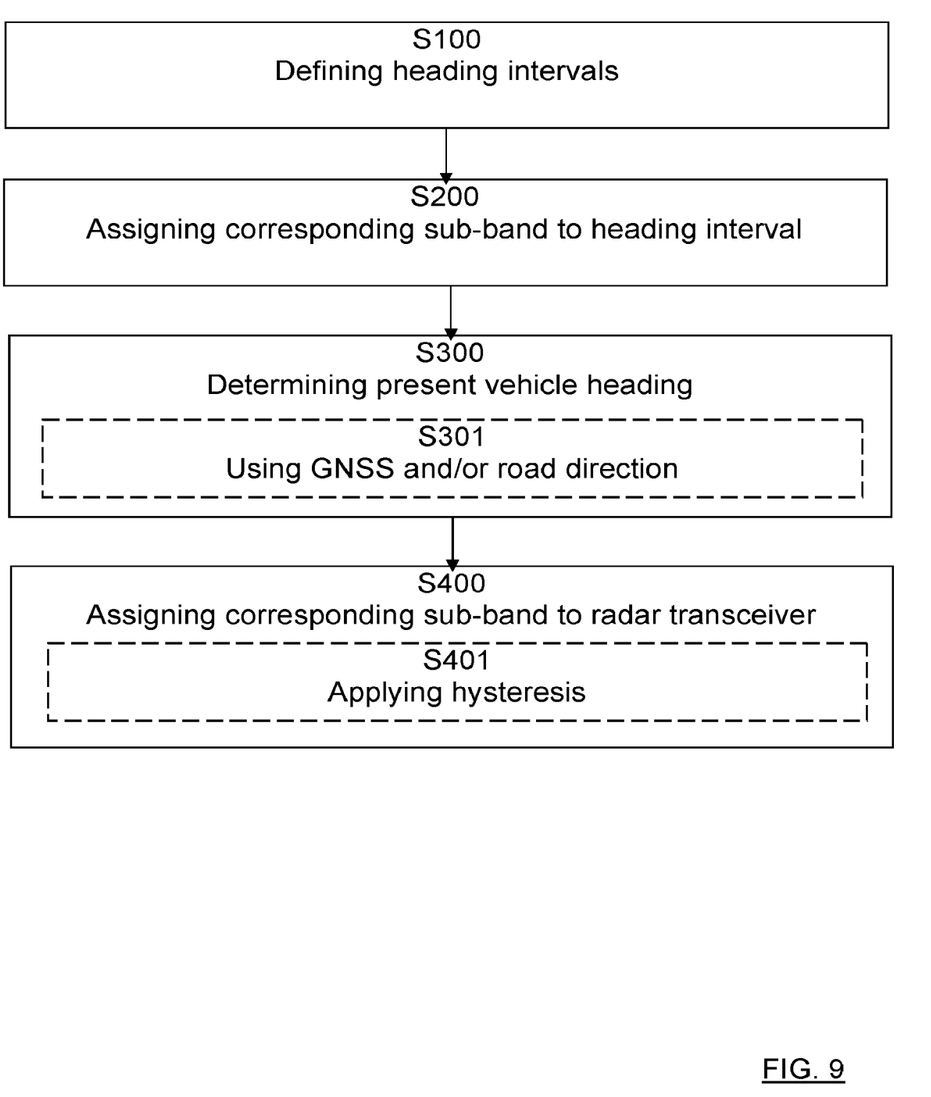
FIG. 9 is a flow chart illustrating methods.

With reference to FIG. 9, the present disclosure also relates to a method for operating a radar system 210 in a vehicle 201, the radar system 210 having a plurality of radar transceivers 202, 203, 204, 205 being associated with a main pointing direction P1, P2, P3, P4 and a certain frequency sub-band A, B, C, D. The sub-bands A, B, C, D together form a certain dedicated frequency band. The method comprises defining at step S100 heading intervals which divide a full turn interval 0°-360° into sections, assigning at step S200 a corresponding sub-band A, B, C, D to each heading interval and determining at step S300 a present vehicle heading F. The method further comprises assigning at step S400 a corresponding sub-band A, B, C, D to each one of the radar transceivers 202, 203, 204, 205 in dependence of the heading interval that comprises the present vehicle heading F.

According to some aspects of embodiments of the present invention, the method comprises applying at step S401 a hysteresis before performing a shift of sub-bands when passing a border.

According to some aspects of embodiments of the present invention, the method comprises determining if a radar transceiver 202, 203, 204, 205 that has been assigned a corresponding sub-band in dependence of the heading interval that comprises the present vehicle heading F is subject to interference, or will cause interference. If that is not the case, the method comprises assigning two or more sub-bands A, B, C, D to that radar transceiver 202, 203, 204, 205.

According to some aspects of embodiments of the present invention, the method comprises determining at step S301 a present vehicle heading F by means of GNSS (Global Navigation Satellite System) data and/or by determining a predominant road extension direction.

The present disclosure is not limited to the examples discussed, but may vary freely whiting the scope of the appended claims. For example, the dedicated frequency bands may be any suitable frequency band, and the sub-bands can be of any division that is appropriate for the present disclosure.

The radar transceivers can be of any suitable kind, and can according to some aspects of embodiments of the present invention comprise suitable devices such as antennas, transmitters, receivers, control units etc.

The control unit 208 may be constituted by one unit or by two or more distributed sub-units.

Generally, the present disclosure relates to a radar system 210 for a vehicle 200, comprising a plurality of radar transceivers 202, 203, 204, 205 and a control unit 208. Each radar transceiver 202, 203, 204, 205 is associated with a main pointing direction P1, P2, P3, P4 and a certain frequency sub-band A, B, C, D, where the sub-bands A, B, C, D together form a certain dedicated frequency band. The control unit 208 is adapted to define heading intervals which divide a full turn interval 0°-360° into sections, to assign a corresponding sub-band A, B, C, D to each heading interval, and to determine a present vehicle heading F. The control unit 208 is further adapted to assign a corresponding sub-band A, B, C, D to each one of the radar transceivers 202, 203, 204, 205 in dependence of the heading interval that comprises the present vehicle heading F.

According to some aspects of embodiments of the present invention, the control unit 208 is adapted to apply a hysteresis before performing a shift of sub-bands when passing a border.

According to some aspects of embodiments of the present invention, the radar system 210 comprises a front radar transceiver 201 that is assigned another dedicated frequency band.

According to some aspects of embodiments of the present invention, the control unit 208 is adapted to perform signal repair and/or to have a slanted polarization direction of the front radar transceiver 201 when experiencing front radar interference.

According to some aspects of embodiments of the present invention, the radar system 210 comprises a first front corner radar transceiver 202, a second front corner radar transceiver 203, a first rear corner radar transceiver 204, and a second rear corner radar transceiver 205, which corner radar transceivers are assigned a corresponding sub-band in dependence of the heading interval that comprises the present vehicle heading F.

According to some aspects of embodiments of the present invention, the radar system 210 comprises at least one lateral radar transceiver 206, 207, where the control unit 208 is adapted to assign a sub-band to each lateral radar transceiver 206, 207 that corresponds to a sub-band presently being assigned to a neighboring radar transceiver 202, 203, 204, 205 in dependence of the heading interval that comprises the present vehicle heading F.

According to some aspects of embodiments of the present invention, the control unit 208 is adapted to time multiplex the use of the current sub-band between a lateral radar transceiver 206, 207 and a corner radar transceiver 202, 203, 204, 205.

According to some aspects of embodiments of the present invention, the control unit 208 is adapted to determine if a radar transceiver 202, 203, 204, 205 that has been assigned a corresponding sub-band in dependence of the heading interval that comprises the present vehicle heading F is subject to interference, or will cause interference. If that is not the case, the control unit 208 is adapted to assign two or more sub-bands A, B, C, D to that radar transceiver 202, 203, 204, 205.

According to some aspects of embodiments of the present invention, the control unit 208 is adapted to determine a present vehicle heading F by means of GNSS (Global Navigation Satellite System) data.

According to some aspects of embodiments of the present invention, the control unit 208 is adapted to determine a present vehicle heading F by determining a predominant road extension direction.

While the above description constitutes the preferred embodiment of the present invention, it will be appreciated that the invention is susceptible to modification, variation and change without departing from the proper scope and fair meaning of the accompanying claims.

The invention claimed is:

1. A radar system for a vehicle, comprising a plurality of radar transceivers and a control unit, each radar transceiver being associated with a main pointing direction and a certain frequency sub-band, where the certain frequency sub-bands together form a certain dedicated frequency band, where the control unit is adapted to:

define heading intervals which divide a full turn interval 0° 360° into sections, assign a corresponding sub-band of the certain frequency sub-bands to each of the heading intervals, determine a present vehicle heading, assign each of the corresponding sub-bands to each one of the radar transceivers in dependence of the heading interval that comprises the present vehicle heading, and to apply a hysteresis when the present vehicle heading passes a border between two of the heading intervals and before performing a shift of the sub-bands, wherein the plurality of radar transceivers include a first front corner radar transceiver, a second front corner radar transceiver, a first rear corner radar transceiver, and a second rear corner radar transceiver, wherein each of the first front corner radar transceiver, the second front corner radar transceiver, the first rear corner radar transceiver, and the second rear corner radar transceiver are assigned one of the corresponding sub-bands in dependence of the heading interval that comprises the present vehicle heading, and wherein the radar system comprises at least one lateral radar transceiver, where the control unit is adapted to assign one of the sub-bands to each of the at least one lateral radar transceiver that corresponds to one of the sub-bands presently being assigned to a neighboring radar transceiver in dependence of the heading interval that comprises the present vehicle heading.

2. The radar system according to claim 1, comprising a front radar transceiver is configured to operate using another dedicated frequency band.

3. The radar system according to claim 2, wherein the control unit is adapted to perform a signal repair or to have a slanted polarization direction of the front radar transceiver when experiencing a front radar interference.

4. The radar system according to claim 1, wherein the control unit is adapted to time multiplex the use of the current sub-band between the at least one lateral radar transceiver and at least one of the first and second corner radar transceivers.

5. The radar system according to claim 1, wherein the control unit is adapted to determine if one of the radar transceivers that has been assigned a corresponding sub-band in dependence of the heading interval that comprises the present vehicle heading is subject to interference, or will cause interference, and if that is not the case, to assign two or more of the sub-bands to the one of the radar transceivers.

6. The radar system according to claim 1, wherein the control unit is adapted to determine a present vehicle heading by means of one of a GNSS, a Global Navigation Satellite System, or data.

7. The radar system according to claim 1, wherein the control unit is adapted to determine the present vehicle heading by determining a predominant road extension direction.

8. A vehicle comprising the radar system according to claim 1.

9. A method for operating a radar system in a vehicle, the radar system having a plurality of radar transceivers being associated with a main pointing direction and a certain frequency sub-band, where the sub-bands together form a certain dedicated frequency band, the method comprising the steps of:

defining heading intervals which divide a full turn interval 0°-360° into sections;

assigning a corresponding one of the sub-bands to each of the heading intervals;

determining a present vehicle heading;

assigning a corresponding one of the sub-bands to each one of the radar transceivers in dependence of the heading interval that comprises the present vehicle heading, and applying a hysteresis when the present vehicle heading passes a border between two of the heading intervals and before performing a shift of the sub-bands, wherein the plurality of radar transceivers include a first front corner radar transceiver, a second front corner radar transceiver, a first rear corner radar transceiver, and a second rear corner radar transceiver, wherein each of the first front corner radar transceiver, the second front corner radar transceiver, the first rear corner radar transceiver, and the second rear corner radar transceiver are assigned one of the corresponding sub-bands in dependence of the heading interval that comprises the present vehicle heading, and wherein the radar system comprises at least one lateral radar transceiver, and wherein the method further includes assigning one of the sub-bands to each of the at least one lateral radar transceiver that corresponds to one of the sub-bands presently being assigned to a neighboring radar transceiver in dependence of the heading interval that comprises the present vehicle heading.

10. The method according to claim 9, wherein the method further comprises the step of applying a hysteresis before performing a shift of the sub-bands when passing a border.

11. The method according to claim 9, wherein the method further comprises determining if one of the plurality of radar transceivers that has been assigned a corresponding sub-band in dependence of the heading interval that comprises the present vehicle heading is subject to an interference, or will cause the interference, and if that is not the case, assigning two or more of the sub-bands to that radar transceiver.

12. The method according to claim 9, wherein the method further comprises the step of determining the present vehicle heading by use of one of a GNSS system, a Global Navigation Satellite System, data or by determining a predominant road extension direction.

* * * * *